(12) United States Patent
Wariishi et al.

(10) Patent No.: US 6,416,899 B1
(45) Date of Patent: Jul. 9, 2002

(54) FUEL CELL STACK

(75) Inventors: Yoshinori Wariishi; Yosuke Fujii, both of Utsunomiya; Koji Okazaki, Shiki; Akio Yamamoto, Utsunomiya; Takafumi Okamoto, Koshigaya; Manabu Tanaka, Utsunomiya; Shuji Sato, Kawagoe, all of (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/429,449

(22) Filed: Oct. 28, 1999

(30) Foreign Application Priority Data

Nov. 6, 1998 (JP) ............................. 10-316616

(51) Int. Cl.⁷ ........................... H01M 8/02; H01M 8/04
(52) U.S. Cl. ............................... 429/38; 429/34; 429/30
(58) Field of Search ............................. 429/34, 38, 30

(56) References Cited

U.S. PATENT DOCUMENTS 3,421,996 A  1/1969  Coval et al. ................. 204/255
3,926,676 A * 12/1975  Frie et al.

FOREIGN PATENT DOCUMENTS

| GB | 1 417 727 | 12/1975 | |
|----|-----------|---------|---|
| JP | 50-79731 | 6/1975 | |
| JP | 60086773 | 5/1985 | |
| JP | 62145660 | 6/1987 | |
| JP | 04355061 | 12/1992 | |
| JP | 05129032 | 5/1993 | |
| JP | 8-213044 | 8/1996 | ............ H01M/8/24 |
| JP | 9-55216 | 2/1997 | ............ H01M/8/02 |
| JP | 9-293524 | 11/1997 | ............ H01M/8/04 |
| JP | 10-199552 | 7/1998 | ............ H01M/8/02 |

* cited by examiner

*Primary Examiner*—Gabrielle Brouillette
*Assistant Examiner*—Jonathan Crepeau
(74) *Attorney, Agent, or Firm*—Lahive & Cockfield, LLP

(57) ABSTRACT

Disclosed is a fuel cell stack comprising fuel cell units and first and second separators which are alternately stacked with each other. Wedge members are integrally inserted, over the plurality of fuel cell units, into communication holes of a fuel gas supply passage, an oxygen-containing gas supply passage, and a cooling water supply passage, as well as a fuel gas discharge passage, an oxygen-containing gas discharge passage, and a cooling water discharge passage. A fluid is uniformly delivered to each of the fuel cell units by the aid of the wedge members. Accordingly, the fluid of any one of a fuel gas, an oxygen-containing gas, and a cooling medium is uniformly delivered to each of the fuel cell units. Further, it is possible to simplify the arrangement of the fuel cell stack.

19 Claims, 11 Drawing Sheets

F I G.15
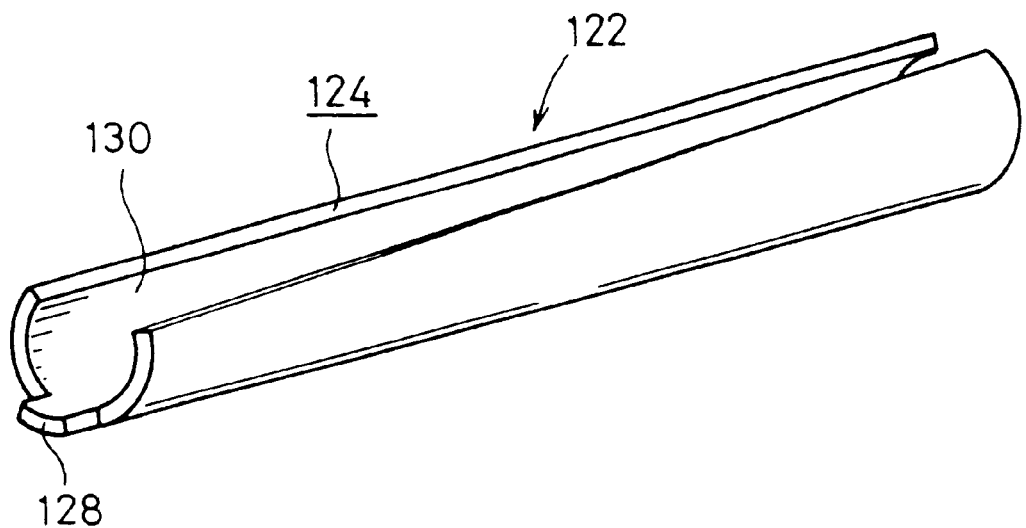

FUEL CELL STACK

BACKGROUND OF THE INVENTION

1. Field of the Invention

The present invention relates to a fuel cell stack comprising separators and fuel cell units each including an anode electrode and a cathode electrode with an electrolyte interposed therebetween, the fuel cell units and the separators being alternately stacked.

2. Description of the Related Art

For example, the solid polymer fuel cell is generally composed of a fuel cell stack comprising fuel cell units stacked with each other by being interposed by separators, each of the fuel cell units including an anode electrode and a cathode electrode which are arranged on both sides of an electrolyte composed of a polymer ion exchange membrane (cation exchange membrane).

In such a fuel cell stack, the fuel gas, for example, a gas principally containing hydrogen (hereinafter referred to as "hydrogen-containing gas"), which is supplied to the anode electrode, contains hydrogen which is ionized on the catalyst electrode and which is moved to the cathode electrode via the electrolyte that is appropriately humidified. The electron, which is generated during this process, is extracted by an external circuit, and it is utilized as DC electric energy. The cathode electrode is supplied with an oxidizing gas, for example, a gas principally containing oxygen (hereinafter referred to as "oxygen-containing gas") or air. Therefore, the hydrogen ion, the electron, and the oxygen are reacted with each other on the cathode electrode to produce water.

In such a process, it is necessary to sufficiently humidify the electrolyte composed of the polymer ion exchange membrane in order to maintain the ion permeability. For this reason, the fuel cell is generally constructed as follows. That is, the oxygen-containing gas and the fuel gas are humidified by using a gas-humidifying unit which is provided at the outside of the fuel cell. The gases are fed to the fuel cell stack together with water vapor so that the electrolyte is humidified.

The fuel cell stack comprises the plurality of fuel cell units which are stacked together with the separators intervening therebetween. Communication holes, which are used to supply the fuel gas, the oxygen-containing gas, and the cooling water (cooling medium) to the respective fuel cell units, are formed to penetrate through the plurality of fuel cell units in an integrated manner in the fuel cell stack. In this arrangement, it is necessary that the fluid such as the fuel gas is uniformly supplied to the respective fuel cell units stacked in the fuel cell stack, in order to maintain the power generation performance of each of them.

In this context, a fuel cell is known, which is disclosed, for example, in Japanese Laid-Open Patent Publication No. 8-213044. This conventional technique adopts delivery flow passages for delivering the fuel which is allowed to flow thereinto from an inflow port, to each of a plurality of unit cells. A fuel flow-adjusting member is arranged in the delivery flow passage by providing a gap with respect to the inflow port. The flow-adjusting member is composed of a porous member having a predetermined thickness to allow the fuel to permeate therethrough. The flow-adjusting member functions to adjust the flow of the fuel in the delivery flow passage.

However, the fuel cell stack comprises the fuel cell units and the separators which are alternately stacked with each other. Therefore, any steps arise for each of the separators in the communication hole. The fluid such as the fuel fails to smoothly flow through the communication hole. As a result, the pressure loss is increased. For this reason, a problem is pointed out in that the fluid cannot be delivered uniformly for each of the fuel cell units. In this context, it is conceived to enlarge the opening cross-sectional area of the communication hole. However, such an arrangement enlarges the size of the stack, resulting in a problem that the entire system becomes large.

SUMMARY OF THE INVENTION

A principal object of the present invention is to provide a fuel cell stack which makes it possible to reduce the pressure loss in the communication hole and uniformly deliver the fluid to each of the fuel cell units.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 15 shows a perspective view illustrating a tube member for constructing the fuel cell stack according to the seventh embodiment of the present invention.

DESCRIPTION OF THE PREFERRED EMBODIMENTS

Figure 1:
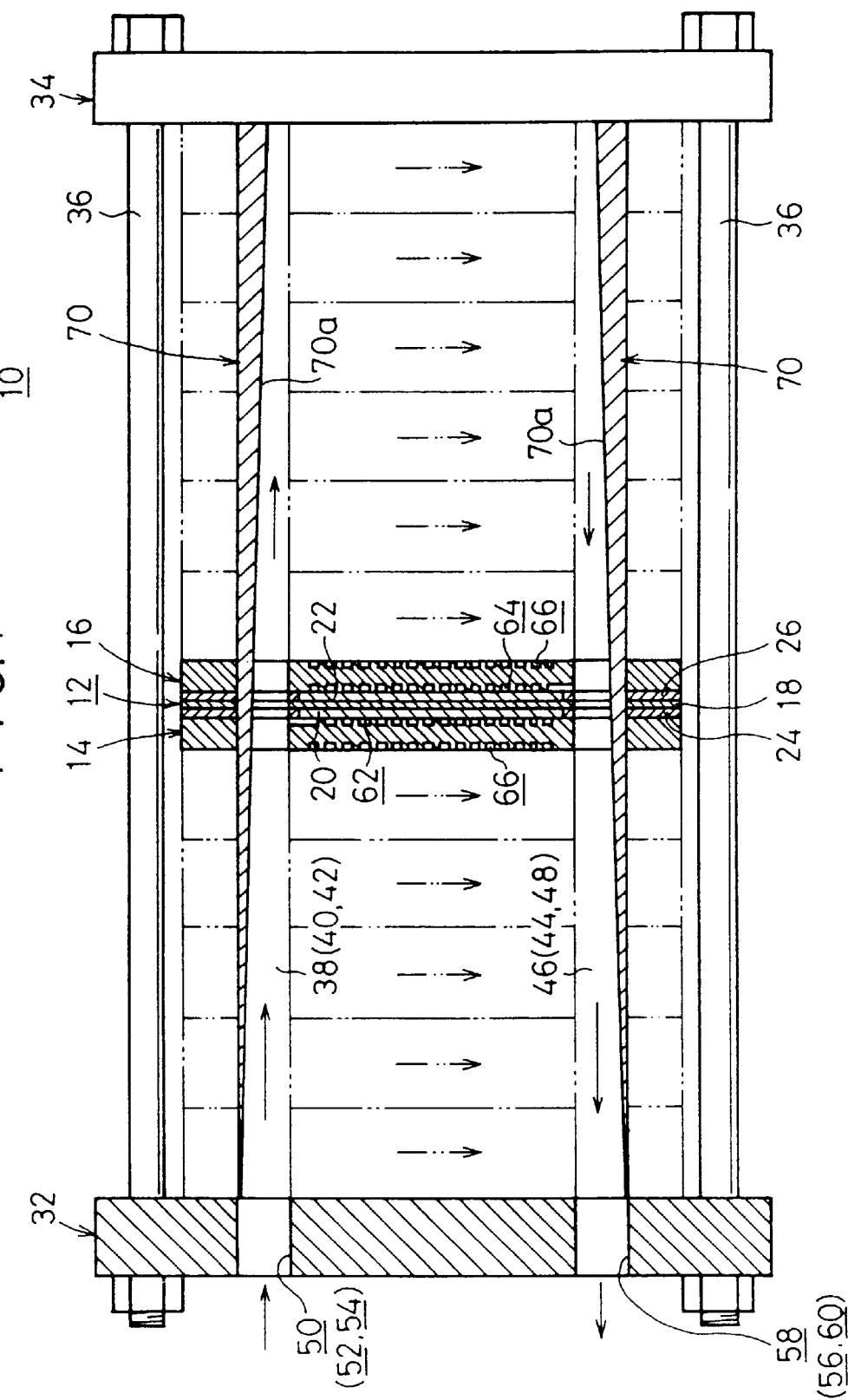
FIG. 1 shows a longitudinal sectional view illustrating major components of a fuel cell stack according to a first embodiment of the present invention.
Figure 2:
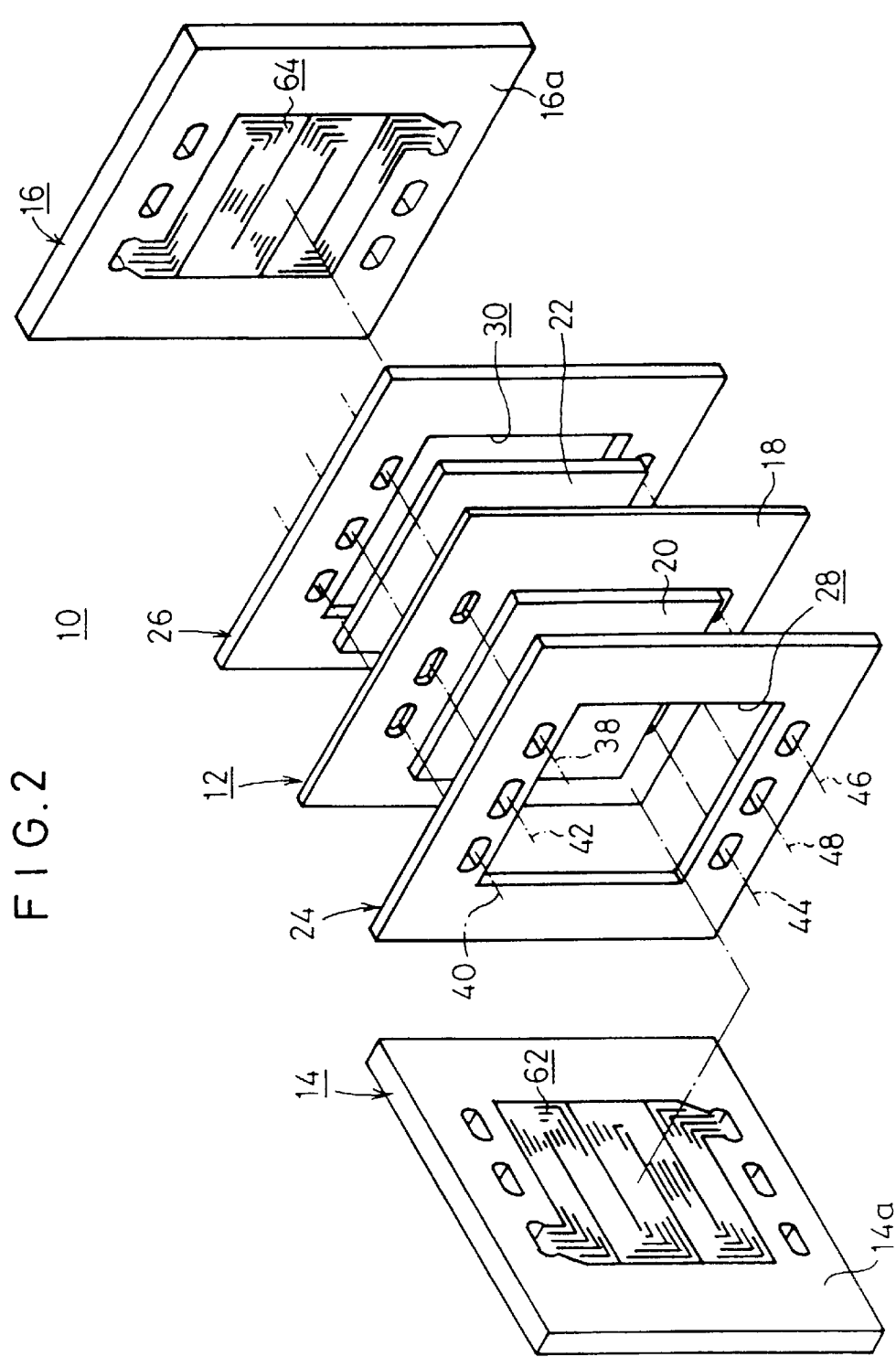
FIG. 2 shows an exploded perspective view illustrating a part of the fuel cell stack.

FIG. 1 shows a longitudinal sectional view illustrating major components of a fuel cell stack 10 according to the first embodiment of the present invention, and FIG. 2 shows an exploded perspective view illustrating a part of the fuel cell stack 10.

The fuel cell stack 10 comprises fuel cell units 12 and first and second separators 14, 16 for interposing the fuel cell units 12 therebetween. A plurality of sets of these components are optionally stacked with each other. The fuel cell unit 12 includes a solid polymer ion exchange membrane 18, and an anode electrode 20 and a cathode electrode 22 which are arranged with the ion exchange membrane 18 interposed therebetween.

As shown in FIG. 2, first and second gaskets 24, 26 are provided on both sides of the fuel cell unit 12. The first gasket 24 has a large opening 28 for accommodating the anode electrode 20, while the second gasket 26 has a large opening 30 for accommodating the cathode electrode 22.

The fuel cell unit 12 and the first and second gaskets 24, 26 are interposed by the first and second separators 14, 16. A plurality of sets of these components are stacked in the horizontal direction. First and second end plates 32, 34 are arranged at both ends in the stacking direction of the fuel cell units 12 and the first and second separators 14, 16. The first and second end plates 32, 34 are integrally tightened and fixed-by the aid of tie rods 36 (see FIGS. 1 and 3).

As shown in FIG. 2, a fuel gas supply passage 38, an oxygen-containing gas supply passage 40, and a cooling water supply passage 42 are integrally formed as communication holes which are disposed at upper portions of the fuel cell stack 10. A fuel gas discharge passage 44, an oxygen-containing gas discharge passage 46, and a cooling water discharge passages 48 are integrally formed at lower portions. The second end plate 34 includes a communication hole which is formed by hollowing out the surface disposed on the stacking side. When the air is used as the oxygen-containing gas, it is noted that the content of oxygen is about 20%. Therefore, the aperture size of the oxygen-containing gas supply passage 40 and the oxygen-containing gas discharge passage 46 are designed to be larger than the aperture size of the fuel gas supply passage 38 and the fuel gas discharge passage 44.

Figure 3:
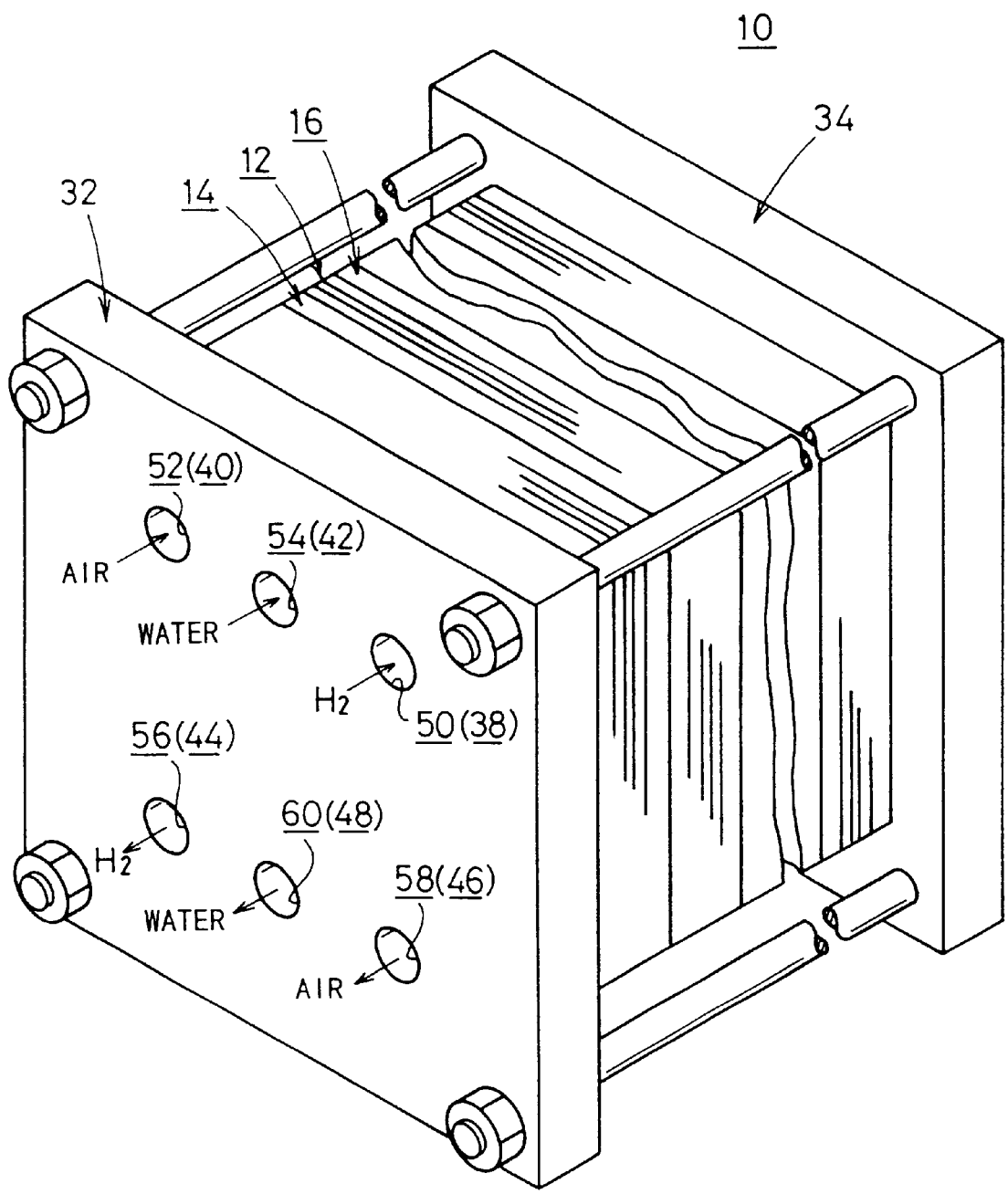
FIG. 3 shows a perspective view illustrating the fuel cell stack.

As shown in FIG. 3, a fuel gas inlet 50 communicating with the fuel gas supply passage 38, an oxygen-containing gas inlet 52 communicating with the oxygen-containing gas supply passage 40, and a cooling water inlet 54 communicating with the cooling water supply passage 42 are formed at upper portions of the first end plate 32. A fuel gas outlet 56 communicating with the fuel gas discharge passage 44, an oxygen-containing gas outlet 58 communicating with the oxygen-containing gas discharge passage 46, and a cooling water outlet 60 communicating with the cooling water discharge passage 48 are formed at lower portions of the first end plate 32.

As shown in FIG. 2, a first flow passage 62, which makes communication between the fuel gas supply passage 38 and the fuel gas discharge passage 44 and which extends in the vertical direction while meandering in the right and left directions, is formed at a surface portion 14a of the first separator 14 opposed to the anode electrode 20. A second flow passage 64, which makes communication between the oxygen-containing gas supply passage 40 and the oxygen-containing gas discharge passage 46 and which extends in the vertical direction while meandering in the right and left directions, is formed at a surface portion 16a of the second separator 16 opposed to the cathode electrode 22. A third flow passage 66, which makes communication between the cooling water supply passage 42 and the cooling water discharge passage 48 and which extends in the vertical direction while meandering in the right and left directions, is formed at each of the other surface portions of the first and second separators 14, 16 (see FIG. 1).

Figure 4:
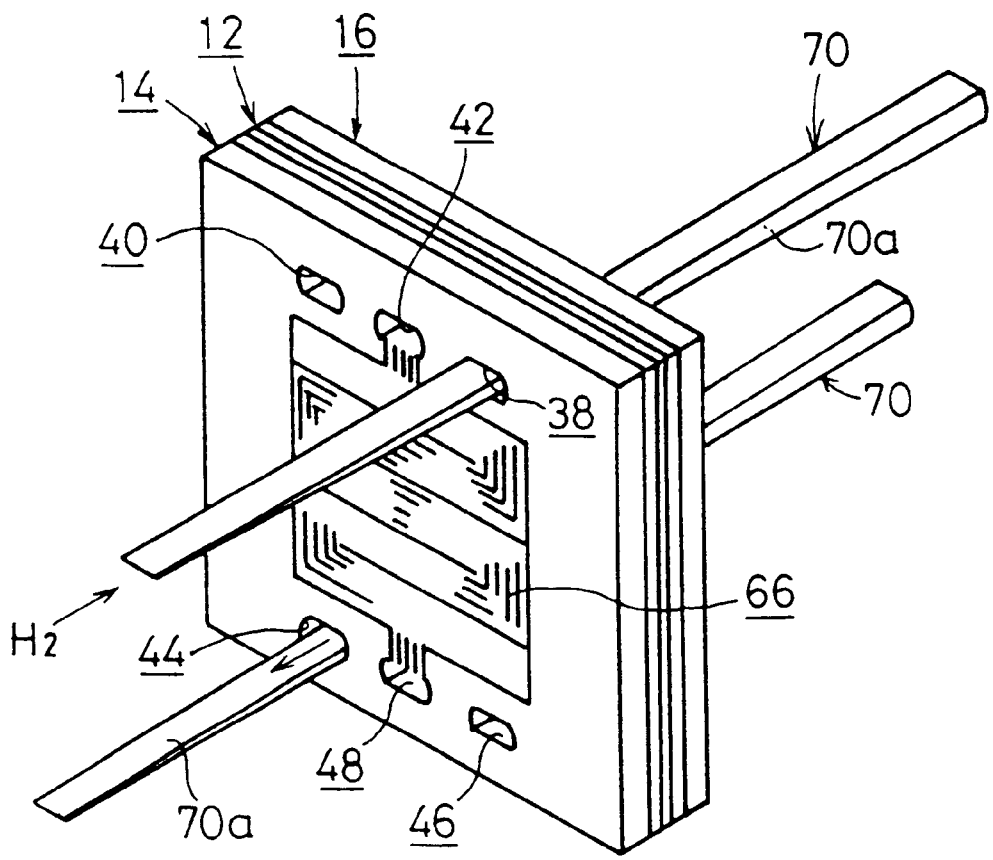
FIG. 4 shows a perspective view illustrating a state in which wedge members are inserted into a fuel cell unit and first and second separators which constitute the fuel cell stack.

As shown in FIGS. 1 and 4, wedge members (insert members) 70 are integrally inserted into the fuel gas supply passage 38 and the fuel gas discharge passage 44, ranging over the plurality of fuel cell units 12. The wedge member 70 is formed of an insulative material, for example, a resin material such as polycarbonate resin. A smoothing treatment such as the mirror finish is applied to at least a surface 70a to make contact with the fuel gas (for example, the hydrogen-containing gas). When the wedge member 70 is composed of metal, it is necessary to coat its surface with a rubber material. It is also preferable that an inclined portion of the wedge member 70 has a curved configuration with a predetermined curvature. Similarly, the wedge member 70 is inserted into each of the oxygen-containing gas supply passage 40, the oxygen-containing gas discharge passage 46, the cooling water supply passage 42, and the cooling water discharge passage 48.

Figure 5:
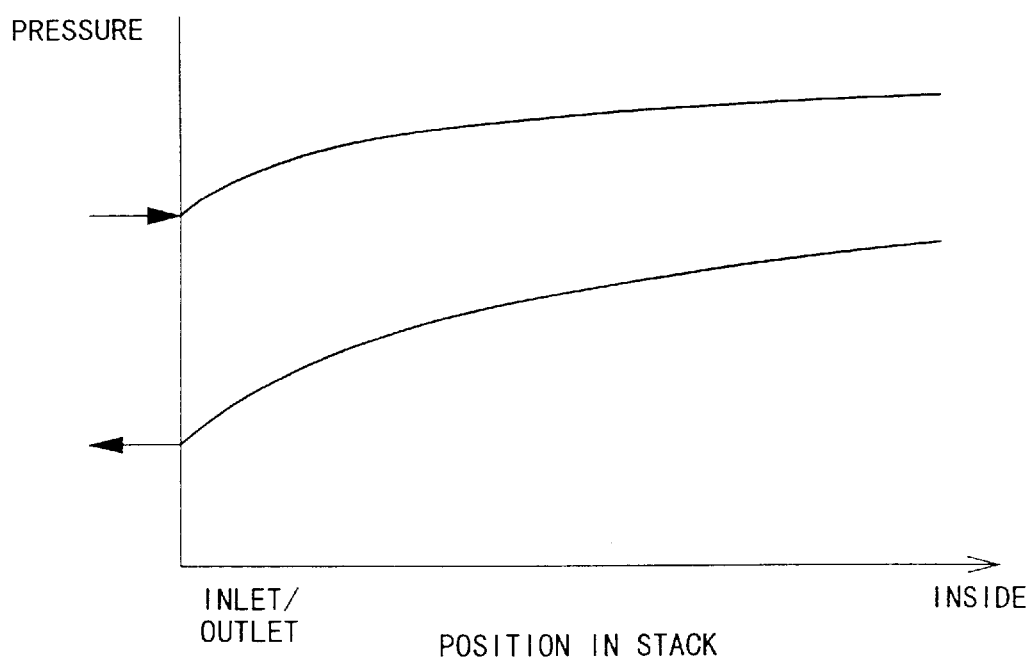
FIG. 5 illustrates a static pressure distribution concerning the counter flow type communication hole.
Figure 8:
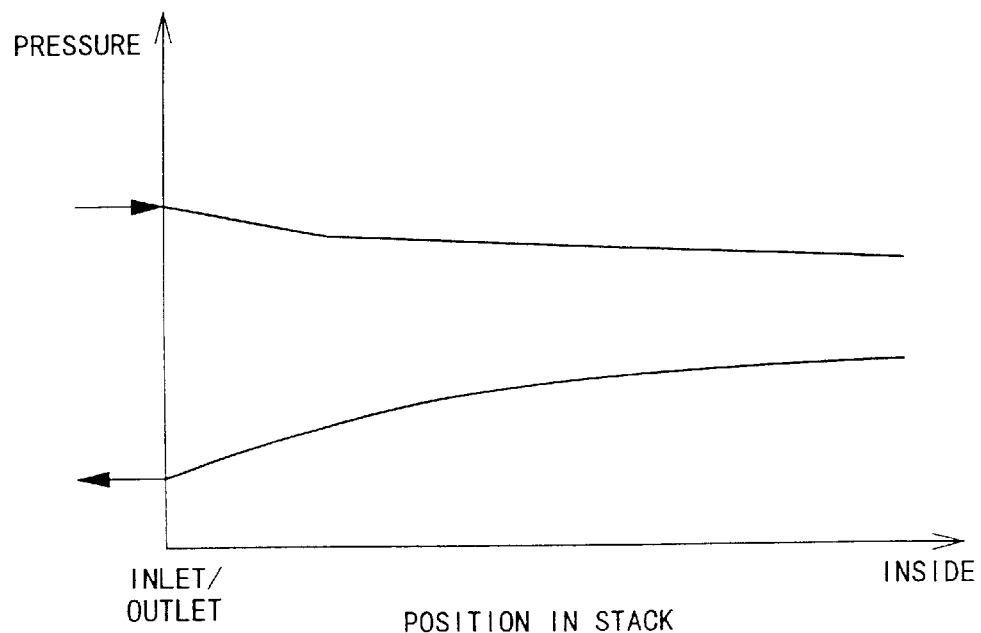
FIG. 8 illustrates another static pressure distribution concerning the counter flow type communication hole.

The fuel cell stack 10 according to the first embodiment is of the so-called counter flow type in which the inlet and the outlet for the fuel gas, the oxygen-containing gas, and the cooling water are provided at the first end plate 32. In the case of this type, when the flow passage pressure loss is small in the stack, a static pressure distribution as shown in FIG. 5 is obtained. On the other hand., when the flow passage pressure loss is large in the stack, a static pressure distribution as shown in FIG. 8 is obtained.

In this embodiment, the case of the fuel cell stack 10 includes the fuel gas supply passage 38 and the fuel gas discharge passage 44 to serve as the communication holes which are not so lengthy and each of which has a small flow passage resistance. Therefore, the static pressure distribution as shown in FIG. 5 is obtained. Accordingly, the wedge member 70 is arranged in each of the fuel gas supply passage 38 and the fuel gas discharge passage 44 so that the opening cross-sectional area is reduced toward the inside of the fuel cell stack 10. On the other hand, the wedge member 70 is arranged so that the opening cross-sectional area is reduced toward the inside of the fuel cell stack 10, in each of the oxygen-containing gas supply passage 40, the oxygen-containing gas discharge passage 46, the cooling water supply passage 42, and the cooling water discharge passage 48, in the same manner as described above.

The operation of the fuel cell stack 10 constructed as described above will be explained below.

The hydrogen-containing gas (fuel gas), which is previously allowed to contain water vapor, is supplied to the fuel gas supply passage 38 from the fuel gas inlet 50 formed through the first end plate 32. The air (or the oxygen-containing gas), which is the oxidizing gas containing water vapor, is supplied to the oxygen-containing gas supply passage 40 from the oxygen-containing gas inlet 52.

The hydrogen-containing gas, which has been introduced into the fuel gas supply passage 38, is moved in the downward direction along the first flow passage 62, and it is simultaneously supplied to the anode electrode 20 of the fuel cell unit 12. On the other hand, the air, which has been introduced into the oxygen-containing gas supply passage 40, is also moved in the downward direction along the second flow passage 64, and it is simultaneously supplied to the cathode electrode 22 of the fuel cell unit 12. Accordingly, the hydrogen in the hydrogen-containing gas is ionized, and it is moved toward the cathode electrode 22 via the ion exchange membrane 18. Thus, the electric power is generated in the respective fuel cell units 12.

The unreacted hydrogen-containing gas is fed through the fuel gas discharge passage 44 to the fuel gas outlet 56. The unreacted air is discharged through the oxygen-containing gas discharge passage 46 to the oxygen-containing gas outlet 58. The cooling water is supplied to the cooling water supply passage 42 from the cooling water inlet 54. The cooling water flows through the third flow passages 66 of the first and second separators 14, 16, and thus the respective fuel cell units 12 are cooled. After that, the cooling water is discharged from the cooling water outlet 60.

In the case of the counter flow type fuel cell stack 10, when the communication holes, for example, the fuel gas supply passage 38 and the fuel gas discharge passage 44 are not so lengthy, and the flow passage resistance is small, then the static pressure distribution as shown in FIG. 5 is obtained. That is, the pressure Is increased at a position disposed deeper from the fuel gas inlet 50. Further, the pressure is increased at a position disposed deeper from the fuel gas outlet 56.

Accordingly, in the first embodiment, the wedge members 70 are arranged in the fuel gas supply passage 38 and the fuel gas discharge passage 44 so that the opening cross-sectional area is reduced toward the inside. Therefore, the hydrogen-containing gas, which is supplied to the fuel gas supply passage 38, is moved at a flow rate which is made faster by the aid of the wedge member 70 as the hydrogen-containing gas flows to the deeper portions of the fuel gas supply passage 38. Accordingly, the gas pressure is reduced at the deeper portions. On the other hand, the unreacted hydrogen-containing gas, which is introduced into the fuel gas discharge passage 44, is moved at a flow rate which is made slower as the unreacted hydrogen-containing gas flows toward the fuel gas outlet 56. Accordingly, the gas pressure is increased on the side of the fuel gas outlet 56.

Therefore, the following effect is obtained in the first embodiment. That is, the pressure loss is reduced in the communication hole. The differential pressure in the communication hole between the static pressure on the inlet side and the static pressure on the outlet side is made uniform. The delivery performance is improved for the hydrogen-containing gas with respect to the respective fuel cell units 12 in the fuel cell stack 10. Thus, the power generation performance of each of the fuel cell units 12 is effectively improved.

Further, the wedge member 70 integrally penetrates through the fuel cell units 12 and the first and second separators 14, 16 which are stacked with each other. Any steps, which would be otherwise caused by the first and second separators 14, 16, does not arise in the fuel gas supply passage 38 and the fuel gas discharge passage 44 which serve as the communication passages. Accordingly, the flow of the hydrogen-containing gas is not disturbed. The hydrogen-containing gas flows smoothly and reliably through the fuel cell stack 10, and it is supplied to the respective fuel cell units 12 in a well suited manner.

In this arrangement, the surface 70a of the wedge member 70, which contacts with the hydrogen-containing gas, is applied with the smoothing treatment. Therefore, it is advantageous that the flow of the hydrogen-containing gas is smoother. The wedge members 70 are inserted in the integrated manner, and hence the rigidity of the entire fuel cell stack 10 is effectively improved. Further, the water, which is produced in the fuel cell stack 10, can be easily discharged to the outside along the inclination of the wedge member 70.

Especially, the produced water is condensed in the fuel cell stack 10 including the solid polymer ion exchange membrane 18. The produced water can be reliably discharged by using the wedge member 70. Thus, it is possible to effectively maintain the power generation performance. Further, it is unnecessary to provide any knock pin or the like for positioning the fuel cell units 12 and the first and second separators 14, 16 with each other. Thus, it is possible to simplify the arrangement.

On the other hand, the wedge members 70 are also inserted into the oxygen-containing gas supply passage 40, the oxygen-containing gas discharge passage 46, the cooling water supply passage 42, and the cooling water discharge passage 48 in the same manner as described above. Therefore, the following effect is obtained. That is, the cooling water and the air or the oxygen-containing gas as the oxidizing gas are uniformly delivered to the respective fuel cell units 12.

Figure 6:
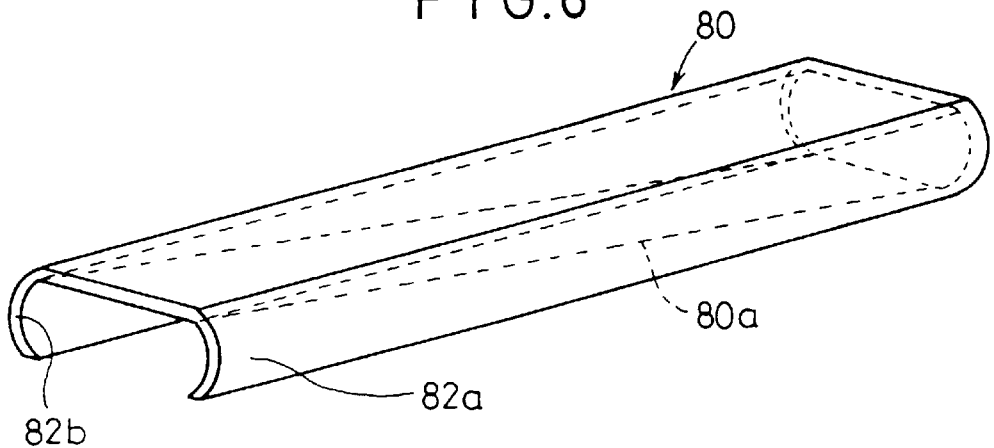
FIG. 6 shows a perspective view illustrating a wedge member for constructing a fuel cell stack according to a second embodiment of the present invention.

FIG. 6 shows a perspective view illustrating a wedge member (insert member) 80 for constructing a fuel cell stack according to the second embodiment of the present invention. The smoothing treatment such as the mirror finish is applied to a surface 80a of the wedge member 80 to make contact with the fluid such as the hydrogen-containing gas, in the same manner as in the first wedge member 70. The wedge member 80 includes guide sections 82a, 82b each having a circular arc-shaped cross section, the guide sections 82a, 82b being provided on both sides of the wedge member 80 to be inserted, for example, with respect to the both wall surfaces of the fuel gas supply passage 38.

Accordingly, for example, when the wedge member 80 is inserted into the fuel gas supply passage 38, the guide sections 82a, 82b are supported by the both wall surfaces of the fuel gas supply passage 38. Therefore, it is possible to reliably prevent the wedge member 80 from occurrence of any positional deviation in the fuel gas supply passage 38. Further, the following effect is obtained. That is, the pressure loss in the communication hole is further reduced owing to the mirror finish applied to the surface of the guide sections 82a, 82b to make contact with the fluid. Thus, the fluid can be uniformly delivered.

Figure 7:
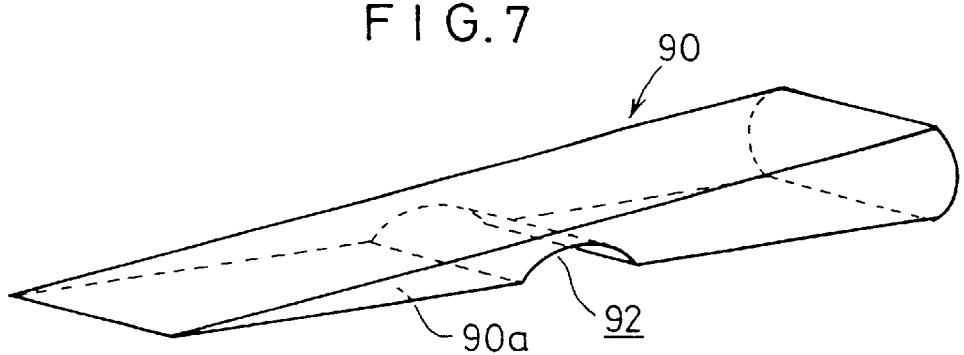
FIG. 7 shows a schematic perspective view illustrating a wedge member for constructing a fuel cell stack according to a third embodiment of the present invention.

FIG. 7 shows a schematic perspective view illustrating a wedge member (insert member) 90 for constructing a fuel cell stack according to the third embodiment of the present invention. The smoothing treatment is applied to a surface 90a of the wedge member 90 to make contact with the fluid such as the fuel gas. An irregular section, for example, a recess 92 is provided at an intermediate position of the surface 90a.

Accordingly, in the third embodiment, the opening cross-sectional area of the communication hole is enlarged at a central portion of the fuel cell stack corresponding to the recess 92 of the wedge member 90. The flow rate is decelerated at the recess 92, and the static pressure is increased. Therefore, when the wedge member 90 is installed to the cooling water supply passage 42, the following effect is obtained. That is, the flow rate of the cooling water can be increased especially at the central portion of the fuel cell stack at which the temperature tends to increase. Thus, the temperature distribution in the fuel cell stack can be made uniform as a whole.

The first to third embodiments, which reside in the counter flow type, are illustrative of the case in which the flow passage pressure loss is small in the communication hole as shown in FIG. 5. However, as shown in FIG. 8, when the opening cross-sectional area of the communication hole is small, when the length is lengthy, or when the coefficient of friction is large, then the flow passage resistance is increased, and the pressure is lowered in some cases from the fluid inlet toward the inside.

Figure 9:
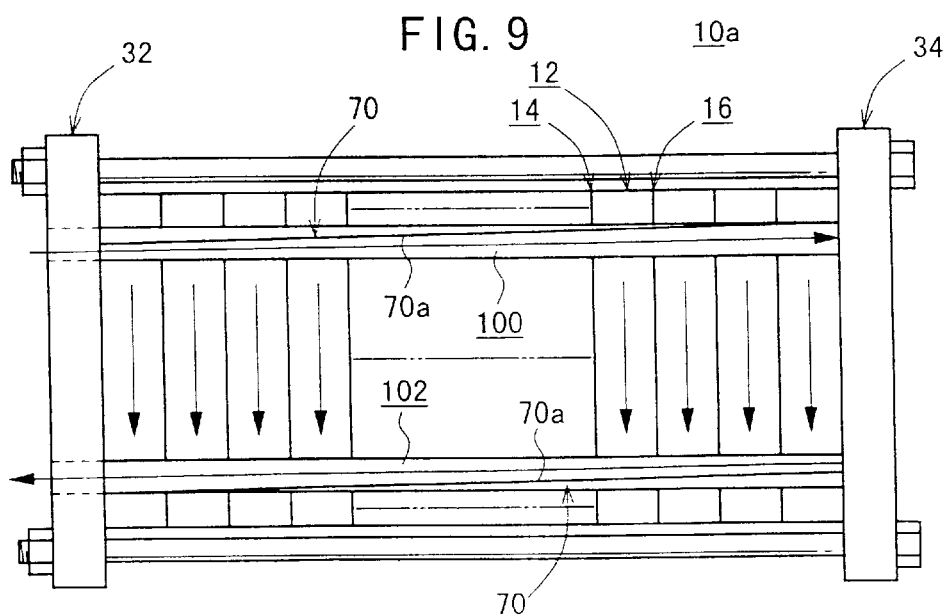
FIG. 9 schematically illustrates a fuel cell stack according to a fourth embodiment of the present invention.

In such a case, a fuel cell stack 10a according to the fourth embodiment shown in FIG. 9 is used. The same constitutive components as those of the fuel cell stack 10 according to the first embodiment are designated by the same reference numerals, detailed explanation of which will be omitted.

The fuel cell stack 10a includes a wedge member 70 which is arranged in a supply communication hole 100 to serve as the fluid supply passage. The wedge member 70 is designed such that the opening cross-sectional area is enlarged from the fluid inlet side toward the inside. Similarly, a wedge member 70 is also arranged in a discharge communication hole 102 which serves as the fluid discharge passage. The wedge member 70 is arranged such that the opening cross-sectional area is enlarged from the inside of the fuel cell stack 10a toward the fluid outlet side.

The fuel cell stack 10a constructed as described above is operated as follows. That is, when the fluid is introduced into the supply communication hole 100 from the fluid inlet side of the first end plate 32, then the flow rate is decelerated during the process in which the fluid is moved to the inside along a surface 70a of the wedge member 20 70, and thus the fluid pressure is increased. On the other hand, concerning the discharge communication hole 102, the fluid pressure is increased from the inside toward the fluid outlet side. Accordingly, the differential pressure can be made uniform between the static pressure in-the supply 25 communication hole 100 and the static pressure in the discharge communication hole 102.

Figure 10:
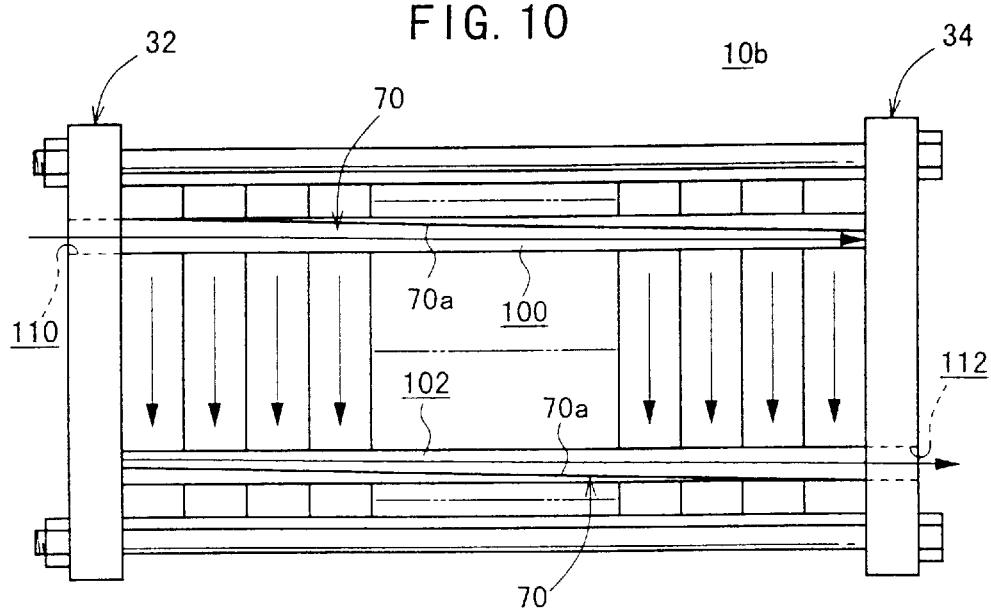
FIG. 10 schematically illustrates a fuel cell stack according to a fifth embodiment of the present invention.

FIG. 10 schematically illustrates a fuel cell stack 10b according to the fifth embodiment of the present invention. The same constitutive components as those of the fuel cell stack 10a according to the fourth embodiment are designated by the same reference numerals, detailed explanation of which will be omitted.

Figure 11:
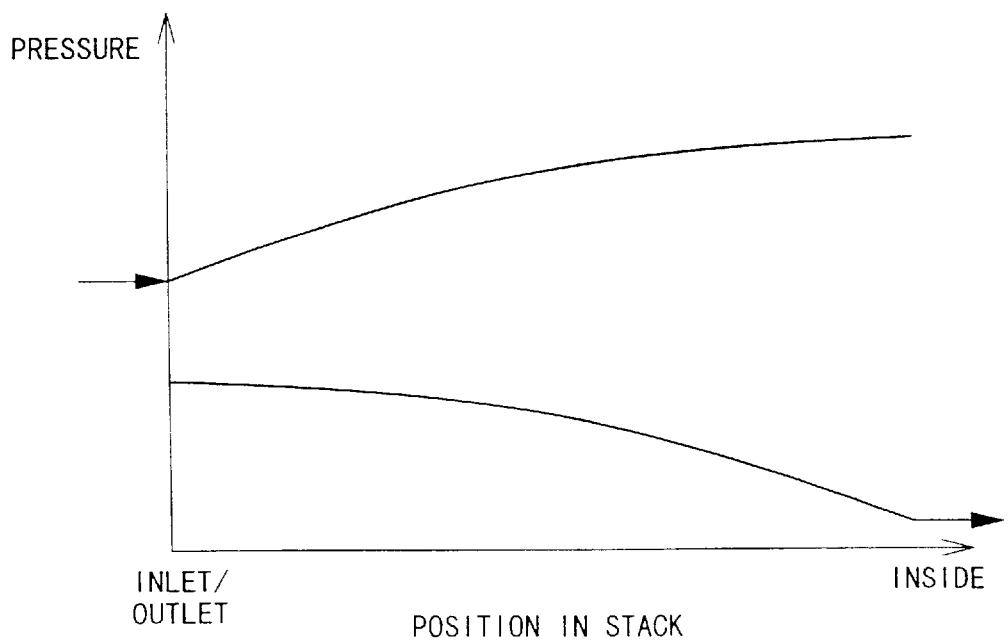
FIG. 11 illustrates a static pressure distribution concerning the cross flow type communication hole.

The fuel cell stack 10b comprises a first end plate 32 which is provided with a fluid inlet 110, and a second end plate 34 which is provided with a fluid outlet 112. Therefore, the fuel cell stack 10b is of the so-called cross flow type. In the case of this type, when the flow passage pressure loss is small in the fuel cell stack 10b, a static pressure distribution is obtained as shown in FIG. 11. On the other hand, when the flow passage pressure loss is large in the fuel cell stack 10b, a static pressure distribution is obtained as shown in FIG. 12.

The fuel cell stack 10b exhibits the static pressure distribution as shown in FIG. 11. A wedge member 70 is arranged in a supply communication hole 100 so that the opening cross-sectional area is reduced from the first end plate 32 toward the second end plate 34. On the other hand, a wedge member 70 is arranged in a discharge communication hole 102 so that the opening cross-sectional area is enlarged from the first end plate 32 toward the second end plate 34.

Accordingly, in the fifth embodiment, when the fluid is supplied from the fluid inlet 110 to the supply communication hole 100, the pressure is decreased during the process in which the fluid is moved toward the second end plate 34. On the other hand, the pressure of the fluid introduced into the discharge communication hole 102 is raised toward the fluid outlet 112. Therefore, the following effect is obtained. That is, the differential pressure can be easily made uniform concerning the static pressure in the supply communication hole 100 and the discharge communication hole 102.

Figure 12:
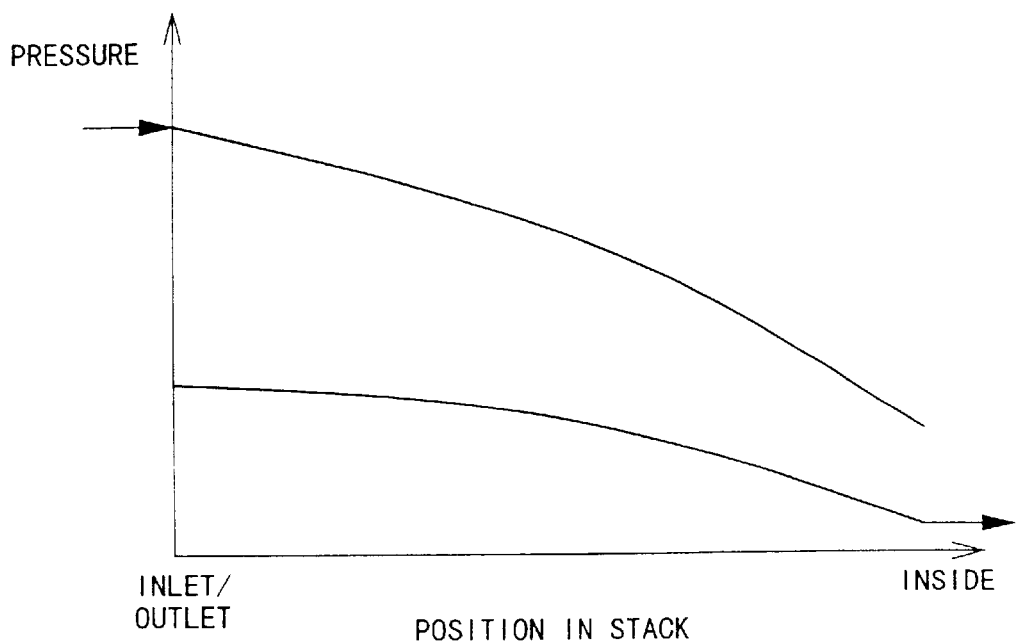
FIG. 12 illustrates another static pressure distribution concerning the cross flow type communication hole.
Figure 13:
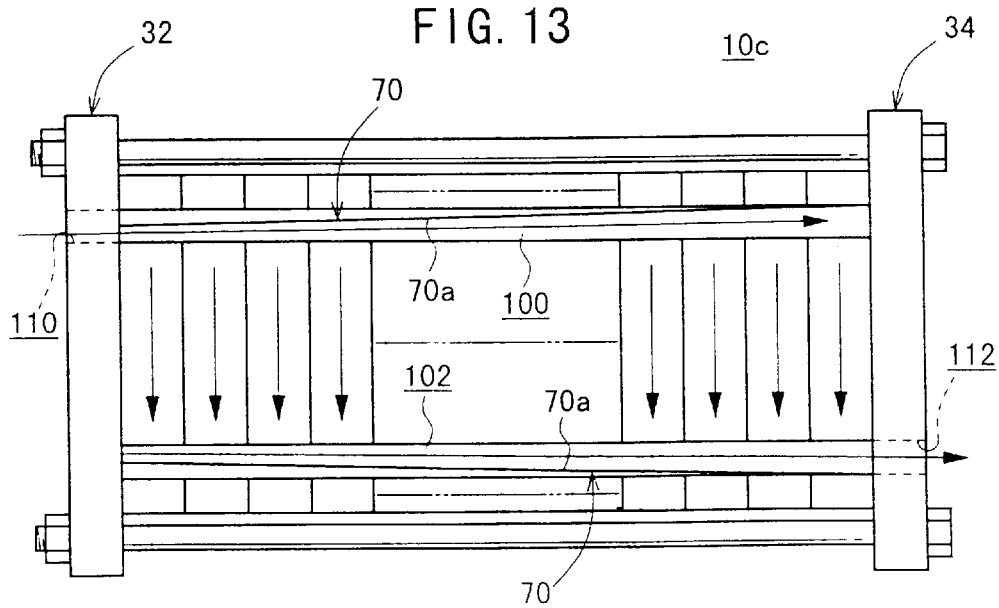
FIG. 13 schematically illustrates a fuel cell stack according to a sixth embodiment of the present invention.

Further, when the pressure distribution as shown in FIG. 12 is obtained, a fuel cell stack 10c according to the sixth embodiment is used as shown in FIG. 13. The same constitutive components as those of the fuel cell stack 10b according to the fifth embodiment are designated by the same reference numerals, detailed explanation of which will be omitted.

In the fuel cell stack 10c, a wedge member 70 is arranged so that the fluid pressure in the supply communication hole 100 is increased from the first end plate 32 toward the second end plate 34. Accordingly, the following effect is obtained in the sixth embodiment. That is, the differential pressure can be effectively made uniform in the supply communication hole 100 and the discharge communication hole.102.

Figure 14:
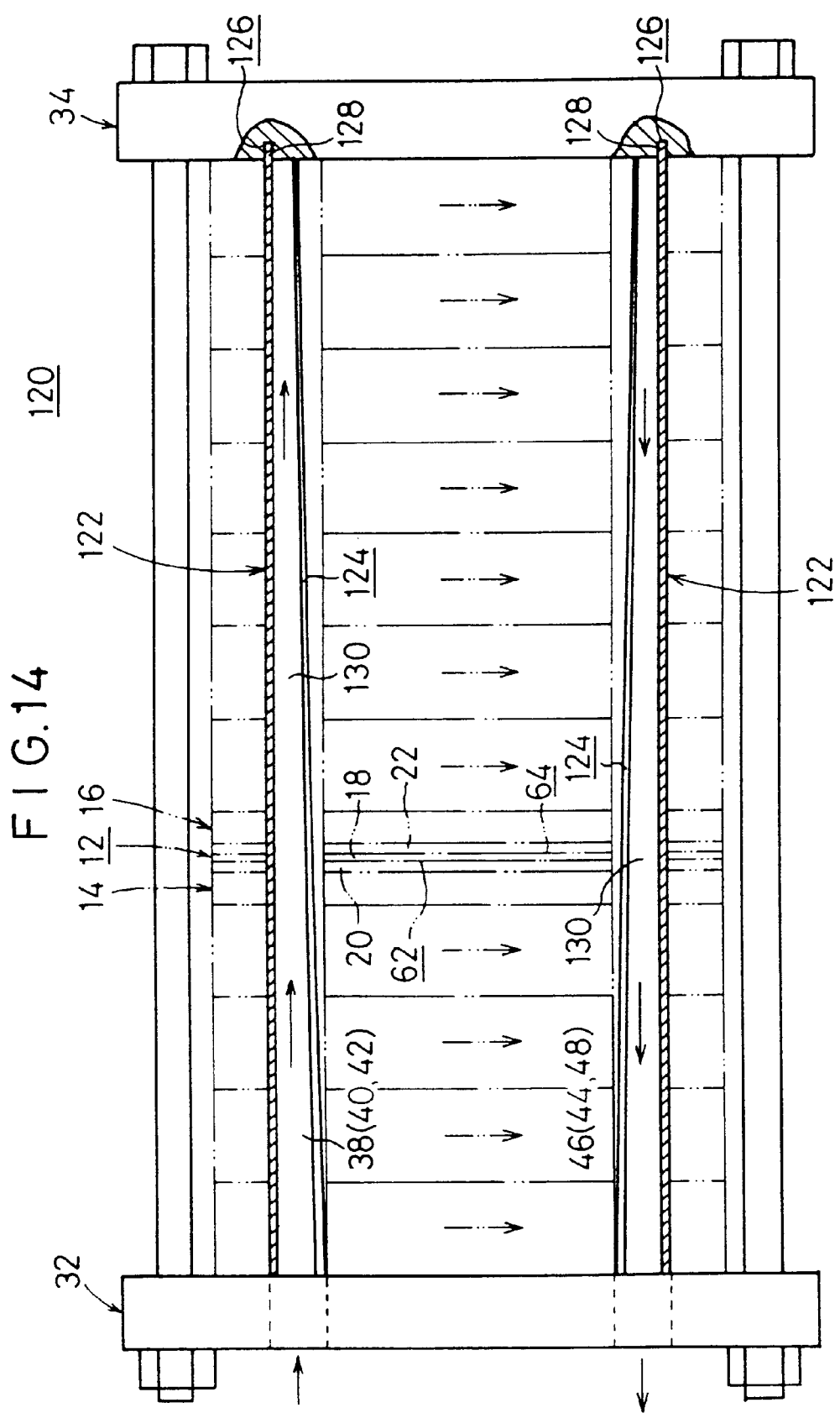
FIG. 14 shows a longitudinal sectional view illustrating major components of a fuel cell stack according to a seventh embodiment of the present invention.

FIG. 14 shows a longitudinal sectional view illustrating major components of a fuel cell stack 120 according to the seventh embodiment of the present invention. The same constitutive components as those of the fuel cell stack 10 according to the first embodiment are designated by the same reference numerals, detailed explanation of which will be omitted.

The fuel cell stack 120 includes tube members (insert members) 122 which are arranged in communication holes of a fuel gas supply passage 38, an oxygen-containing gas supply passage 40, and a cooling water supply passage 42, as well as a fuel gas discharge passage 44, an oxygen-containing gas discharge passage 46, and a cooling water discharge passage 48.

As shown in FIG. 15, the tube member 122 has a cutout 124 which is open on the side of each of the fuel cell units 12. The size of the cutout 124 is changed in the communication hole in the direction from the fluid inlet/outlet of the fuel cell stack 120 to the inside of the fuel cell stack 120. For example, the cutout 124 is designed such that the width becomes wider from the first end plate 32 at which the fluid inlet/outlet is formed, toward the inside of the fuel cell stack 120.

A stopper 128 is formed to protrude from a part of the tube member 122, the stopper 128 being fitted to a groove 126 formed on the second end plate 34 so that the tube member 122 is prevented from rotation. The tube member 122 is made of an insulative material such as resin. The smoothing treatment is applied to an inner surface 130 to make contact with the fluid.

The fuel cell stack 120 constructed as described above is operated as follows. That is, for example, when the hydrogen-containing gas is supplied to the fuel gas supply passage 38, the hydrogen-containing gas is supplied from the cutout 124 of the tube member 122 along the first flow passage 62 to the anode electrode 20 of each of the fuel cell units 12.

In this embodiment, the cutout 124 is designed so that the width is increased from the first end plate 32 toward the second end plate 34. It is difficult for the hydrogen-containing gas to flow into the first flow passage 62 disposed on the side of the first end plate 32 which is on the inlet side. On the other hand, it is easy for the hydrogen-containing gas to flow into the deep side in which the gas delivery performance has been hitherto inferior, i.e., into the first flow passage 62 disposed on the side of the second end plate 34.

Accordingly, in the seventh embodiment, the following effect is obtained. That is, for example, the hydrogen-containing gas can be uniformly delivered to the anode electrode 20 of each of the fuel cell units 12 stacked in the fuel cell stack 120. Thus, the power generation performance of each of the fuel cell units 12 can be effectively maintained.

The cutout 124 is designed such that the width is increased from the first end plate 32 formed with the fluid inlet/outlet toward the inside of the fuel cell stack 120. However, the cutout 124 may be designed such that the width is increased in the communication hole toward the first end plate 32. Alternatively, the cutout 124 may be designed to have a curved configuration in place of the straight configuration.

In the fuel cell stack 120, the tube members 122 are arranged in the communication holes of the fuel gas supply passage 38, the oxygen-containing gas supply passage 40, and the cooling water supply passage 42, as well as the fuel gas discharge passage 44, the oxygen-containing gas discharge passage 46, and the cooling water discharge passage 48. However, the wedge member 70, 80, 90 may be incorporated into any one of the communication holes, in place of the tube member 122.

Alternatively, the fuel cell stack may be constructed by inserting the wedge member 70, 80, 90 into the tube member 122. In this arrangement, the cutout 124 of the tube member 122 may be designed such that the cutout 124 is allowed to have a size which is changed in the communication hole, or the cutout 124 Is allowed to have an identical size, over the range from the first end plate 32 to the second end plate 34.

In the first to seventh embodiments, the communication holes, i.e., the fuel gas supply passage 38, the oxygen-containing gas supply passage 40, and the cooling water supply passage 42, as well as the fuel gas discharge passage 44, the oxygen-containing gas discharge passage 46, and the cooling water discharge passage 48, or the supply communication hole 100 and the discharge communication hole 102 are provided on the upper side and the lower side of the fuel cell stack 10, 10a, 10b, 10c, 120. However, the communication holes may be provided on both sides of the fuel cell stack 10, 10a, 10b, 10c, 120. In this arrangement, the communication hole is designed to have an oblong configuration. Therefore, the cross-sectional secondary moment is increased, and the rigidity is effectively improved in the direction of the gravity. Thus, the deformation of the insert member is reduced. Therefore, the size of the stack in the height direction can be made short, and it is easy to obtain a thin insert member.

The fuel cell stack according to the present invention comprises the insert member which is integrally inserted, over the plurality of fuel cell units, into the communication hole for delivering, to the fuel cell unit, at least any one of the fluids of the fuel gas, the oxygen-containing gas, and the cooling medium. The fluid can be uniformly delivered to the plurality of fuel cell units by the aid of the insert member.

Further, there is no step in the communication hole. The pressure loss of the fluid can be effectively reduced. The rigidity as the entire fuel cell stack is ensured. It is unnecessary to provide any means for positioning the fuel cell unit and the separators. Thus, it is possible to simplify the arrangement.

Usually, it is necessary to use a communication hole having a large opening cross-sectional area in order to uniformly deliver the fluid to a plurality of fuel cell units. On the contrary, the opening cross-sectional area of the communication hole can be decreased by inserting the wedge member into the communication hole. Thus, it is easy to obtain a compact fuel cell stack as a whole and obtain a compact system as a whole.

What is claimed is:

1. A fuel cell stack comprising:
    a plurality of fuel cell units and separators alternately stacked with each other, each of said fuel cell units including a solid polymer ion exchange membrane interposed by an anode electrode and a cathode electrode; and
    a communication hole provided to deliver to said fuel cell units, at least one of fluids of a fuel gas and an oxygen containing gas, said fuel cell stack further comprising;
        an insert member integrally inserted into said communication hole over said plurality of fuel cell units, for uniformly delivering said fluid to said plurality of fuel cell units.

2. The fuel cell stack according to claim 1, wherein said communication hole includes:
    a supply-side communication hole for supplying said fluid;
    a discharge-side communication hole for discharging said fluid; and wherein said insert member includes:
        a supply-side insert member and a discharge-side insert member for setting cross-sectional areas of said supply-side communication hole and said discharge-side communication hole so that a differential pressure is uniform between said supply-side communication hole and said discharge-side communication hole.

3. The fuel cell stack according to claim 1, wherein said communication hole includes:
    a supply-side communication hole which is open on a first end side of said fuel cell stack, for supplying said fluid; and
    a discharge-side communication hole which is open on said first end side of said fuel cell stack, for discharging said fluid, wherein:
        a pressure in said supply-side communication hole is increased toward a second end of said fuel cell stack, and wherein said insert member includes:
            a supply-side insert member for decreasing an opening cross-sectional area of said supply-side communication hole toward said second end of said fuel cell stack; and
            a discharge-side insert member for increasing an opening cross-sectional area of said discharge-side communication hole toward said first end of said fuel cell stack.

4. The fuel cell stack according to claim 1, wherein said communication hole includes:
    a supply-side communication hole which is open on a first end side of said fuel cell stack, for supplying said fluid; and
    a discharge-side communication hole which is open on said first end side of said fuel cell stack, for discharging said fluid, wherein:
        a pressure in said supply-side communication hole is decreased toward a second end of said fuel cell stack, and wherein said insert member includes:
            a supply-side insert member for increasing an opening cross-sectional area of said supply-side communication hole toward said second end of said fuel cell stack; and
            a discharge-side Insert member for increasing an opening cross-sectional area of said discharge-side communication hole toward said first end of said fuel cell stack.

5. The fuel cell stack according to claim 1, wherein said communication hole includes:
    a supply-side communication hole which is open on a first end side of said fuel cell stack, for supplying said fluid; and a discharge-side communication hole which is open on a second end side of said fuel cell stack, for discharging said fluid, wherein:
a pressure in said supply-side communication hole is increased toward said second end of said fuel cell stack, and wherein said insert member includes:
a supply-side insert member for decreasing an opening cross-sectional area of said supply-side communication hole toward said second end of said fuel cell stack; and
a discharge-side insert member for increasing an opening cross-sectional area of said discharge-side communication hole toward said second end of said fuel cell stack.

6. The fuel cell stack according to claim 1, wherein said communication hole includes:
a supply-side communication hole which is open on a first end side of said fuel cell stack, for supplying said fluid; and
a discharge-side communication hole which is open on a second end side of said fuel cell stack, for discharging said fluid, wherein:
a pressure in said supply-side communication hole is decreased toward said second end of said fuel cell stack, and wherein said insert member includes:
a supply-side insert member for increasing an opening cross-sectional area of said supply-side communication hole toward said second end of said fuel cell stack; and
a discharge-side insert member for increasing an opening cross-sectional area of said discharge-side communication hole toward said second end of said fuel cell stack.

7. The fuel cell stack according to claim 1, wherein said insert member includes a wedge member for changing an opening cross-sectional area of said communication hole from a fluid inlet/outlet port of said fuel cell stack to the inside of said fuel cell stack, in said communication hole.

8. The fuel cell stack according to claim 7, wherein said wedge member is arranged in said communication hole along a side opposite to a power generation surface of said fuel cell unit.

9. The fuel cell stack according to claim 7, wherein said wedge member includes an irregular section which is provided at an intermediate position of a planar portion to make contact with said fluid.

10. The fuel cell stack according to claim 1, wherein said insert member includes a tube member having a cutout communicating with a flow passage of said separators, said cutout having a size changing in said communication hole from a fluid inlet/outlet of said fuel cell stack toward the inside of said fuel cell stack.

11. The fuel cell stack according to claim 10, wherein said cutout is arranged in said communication hole along a side of a power generation surface of said fuel cell unit.

12. The fuel cell stack according to claim 10, wherein said tube member has a stopper for preventing said tube member from rotation.

13. A fuel cell stack comprising:
a plurality of fuel cell units and separators alternately stacked with each other, each of said fuel cell units including an electrolyte interposed by an anode electrode and a cathode electrode; and
a communication hole provided to deliver to said fuel cell units, at least any one of fluids of a fuel gas and an oxygen containing gas, and a cooling medium, said fuel cell stack further comprising:
an insert member integrally inserted into said communication hole over said plurality of fuel cell units, for uniformly delivering said fluid to said plurality of fuel cell units,
wherein said insert member includes a wedge member for changing an opening cross-sectional area of said communication hole from a fluid inlet/outlet port of said fuel cell stack to the inside of said fuel cell stack, in said communication hole, said wedge member including an irregular section which is provided at an intermediate position of a planar portion to make contact with said fluid.

14. The fuel cell stack according to claim 13, wherein said communication hole includes:
a supply-side communication hole for supplying said fluid; and
a discharge-side communication hole for discharging said fluid, and wherein said insert member includes:
a supply-side insert member and a discharge-side insert member for setting cross-sectional areas of said supply-side communication hole and said discharge-side communication hole so that a differential pressure is uniform between said supply-side communication hole and said discharge-side communication hole and said discharge-said communication hole.

15. The fuel cell stack according to claim 13, wherein said communication hole includes:
a supply-side communication hole which is open on a first end side of said fuel cell stack, for supplying said fluid; and
a discharge-side communication hole which is open on said first end side of said fuel cell stack, for discharging said fluid, wherein;
a pressure in said supply-side communication hole is increased toward a second end of said fuel cell stack, and wherein said insert member includes:
a supply-side insert member for decreasing an opening cross-sectional area of said supply-side communication hole toward said second end of said fuel cell stack; and
a discharge-side insert member for increasing an opening cross-sectional area of said discharge-side communication hole toward said first end of said fuel cell stack.

16. The fuel cell stack according to claim 13, wherein said communication hole includes:
a supply-side communication hole which is open on a first end side of said fuel cell stack, for supplying said fluid; and
a discharge-side communication hole which is open on said first end side of said fuel cell stack, for discharging said fluid, wherein;
a pressure in said supply-side communication hole is decreased toward a second end of said fuel cell stack, and wherein said insert member includes:
a supply-side insert member for increasing an opening cross-sectional area of said supply-side communication hole toward said second end of said fuel cell stack; and
a discharge-side insert member for increasing an opening cross-sectional area of said discharge-side communication hole toward said first end of said fuel cell stack.

17. The fuel cell stack according to claim 13, wherein said communication hole includes:
a supply-side communication hole which is open on a first end side of said fuel cell stack, for supplying said fluid; and a discharge-side communication hole which is open on a second end side of said fuel cell stack, for discharging said fluid, wherein;
a pressure in said supply-side communication hole is increased toward said second end of said fuel cell stack, and wherein said insert member includes:
a supply-side insert member for decreasing an opening cross-sectional area of said supply-side communication hole toward said second end of said fuel cell stack; and
a discharge-side insert member for increasing an opening cross-sectional area of said discharge-side communication hole toward said second end of said fuel cell stack.

18. The fuel cell stack according to claim 13, wherein said communication hole includes:
a supply-side communication hole which is open on a first end side of said fuel cell stack, for supplying said fluid; and
a discharge-side communication hole which is open on a second end side of said fuel cell stack, for discharging said fluid, wherein;
a pressure in said supply-side communication hole is decreased toward said second end of said fuel cell stack, and wherein said insert member includes:
a supply-side insert member for increasing an opening cross-sectional area of said supply-side communication hole toward said second end of said fuel cell stack; and
a discharge-side insert member for increasing an opening cross-sectional area of said discharge-side communication hole toward said second end of said fuel cell stack.

19. The fuel cell stack according to claim 13, wherein said wedge member is arranged in said communication hole along a side opposite to a power generation surface of said fuel cell unit.

* * * * *